United States Patent [19]

Mueller et al.

[11] Patent Number: 5,369,960
[45] Date of Patent: Dec. 6, 1994

[54] REFRIGERATION SYSTEM FOR AN AIRCRAFT

[75] Inventors: Hans-Juergen Mueller, Henstedt Ulzburg; Ralf Schliwa; Thomas Scherer, both of Hamburg; Harald Kull, Krummesse, all of Germany

[73] Assignee: Deutsche Aerospace Airbus GmbH, Hamburg, Germany

[21] Appl. No.: 110,302

[22] Filed: Aug. 20, 1993

[30] Foreign Application Priority Data

Aug. 22, 1992 [DE] Germany ............... 4227965
Jul. 6, 1993 [DE] Germany ............... 4322412

[51] Int. Cl.⁵ .................. B64D 11/00; B64C 1/18; F25D 15/00; F25D 19/00
[52] U.S. Cl. .................. 62/238.6; 62/480; 62/244; 165/41; 165/168
[58] Field of Search ........... 62/239, 238.6, 480, 62/244; 165/41, 168; 244/121, 117 A, 163

[56] References Cited

U.S. PATENT DOCUMENTS

| | | | |
|---|---|---|---|
| 2,511,876 | 6/1950 | Protzeller | 62/239 |
| 3,090,212 | 5/1963 | Anderson et al. | 62/239 |
| 3,765,354 | 10/1973 | Gronroos | 244/163 X |
| 3,922,876 | 12/1975 | Wetherington et al. | 62/180 |
| 4,339,929 | 7/1982 | Fitzpatrick | 62/79 |
| 4,660,787 | 4/1987 | Sprenger et al. | 244/118.5 |
| 4,830,096 | 5/1989 | Biagini | 165/41 |
| 4,924,676 | 5/1990 | Maier-Laxhuber et al. | 62/59 |
| 4,969,509 | 11/1990 | Merensky | 165/41 |

FOREIGN PATENT DOCUMENTS

3812739 7/1989 Germany.
4105034 8/1992 Germany.

Primary Examiner—Henry A. Bennet
Assistant Examiner—William C. Doerrler
Attorney, Agent, or Firm—W. G. Fasse; W. F. Fasse

[57] ABSTRACT

A refrigeration system for cooling foodstuffs in an aircraft body having a deck and a space (26) below the deck, uses a surface type heat exchanger (7) positioned for a heat exchange with the environment of the aircraft. A catering container (1) is constructed as a cooler box, and at least one refrigeration device (21) is exchangeably mounted in the space below the deck. The refrigeration device (21) is equipped with at least one modular refrigeration unit (6) connected through respective pipes or conduits (8, 9) to the surface type heat exchanger (7). The refrigeration device (21) is connected by further conduit means (3, 10) to the cooler box (1). The temperature difference between inside and outside of the aircraft is efficiently used for the refrigeration.

18 Claims, 5 Drawing Sheets

REFRIGERATION SYSTEM FOR AN AIRCRAFT

FIELD OF THE INVENTION

Foodstuffs are kept at the required temperatures in an aircraft by a refrigeration system that takes advantage of the naturally occurring temperature differences, for example the temperature difference between the outside and the inside of the aircraft or even between the passenger cabin and a loading space below the passenger cabin in the aircraft body, at high altitudes.

BACKGROUND INFORMATION

Conventional passenger service systems for an aircraft are arranged in the passenger cabin which is inefficient because the space taken up by the service system could be used for passenger seats, particularly since such systems require a substantial volume that reduces the space available for the passengers, thereby reducing the number of passengers that can be transported in the aircraft. These space requirements are dictated by the following requirements: a service station where the supplies are made ready, a kitchen, foodstuff storage space, and parking spaces for transport carts, waste collecting devices, as well as heating and cooling units.

U.S. Pat. No. 4,660,787 (Sprenger et al.), issued on Apr. 28, 1987, discloses a food supply system for an aircraft having an upper and a lower deck. A pantry is located on the upper deck and food supply carts carried on a platform are arranged on the lower deck for cooperation with the pantry on the upper deck. A lifting mechanism is arranged for moving carts from the platform to the pantry and vice versa. This known system does not disclose anything regarding the refrigeration of the food supply.

OBJECTS OF THE INVENTION

In view of the foregoing it is the aim of the invention to achieve the following objects singly or in combination:

to provide a refrigeration system for use in an aircraft, whereby the system shall supply during any operational state of the aircraft the required cooling capacity for keeping foodstuffs at the temperatures that are required to maintain the freshness;

to provide a refrigeration system that will maintain the required temperature differences at a substantially improved system efficiency compared to conventional systems; and to take advantage of naturally occurring temperature differences inside the aircraft, for example, between the passenger cabin and the loading space below the passenger cabin or between the aircraft and the outside of the aircraft.

SUMMARY OF THE INVENTION

The refrigeration system for keeping foodstuffs fresh in an aircraft is characterized by at least one modular refrigeration unit arranged within the aircraft body below the passenger deck in an exchangeable manner so that one modular unit may be replaced by another modular unit. The refrigeration unit is connected through ducts with a surface heat exchanger which is arranged at a certain spacing relative to the outer skin of the aircraft body. Additional ducts or pipes connect the refrigeration unit with a catering container that serves as a refrigeration or cooler box, which preferably has a double wall forming a freshwater tank Preferably, a so-called zeolite cooler is used in the refrigeration unit, whereby the characteristics of a zeolite mineral are advantageously utilized. Such minerals give off their water content when heated, thereby evaporating the water. When cooled, these minerals again absorb the water, whereby the cycle can be repeated as often as desired.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figures 1, 2:
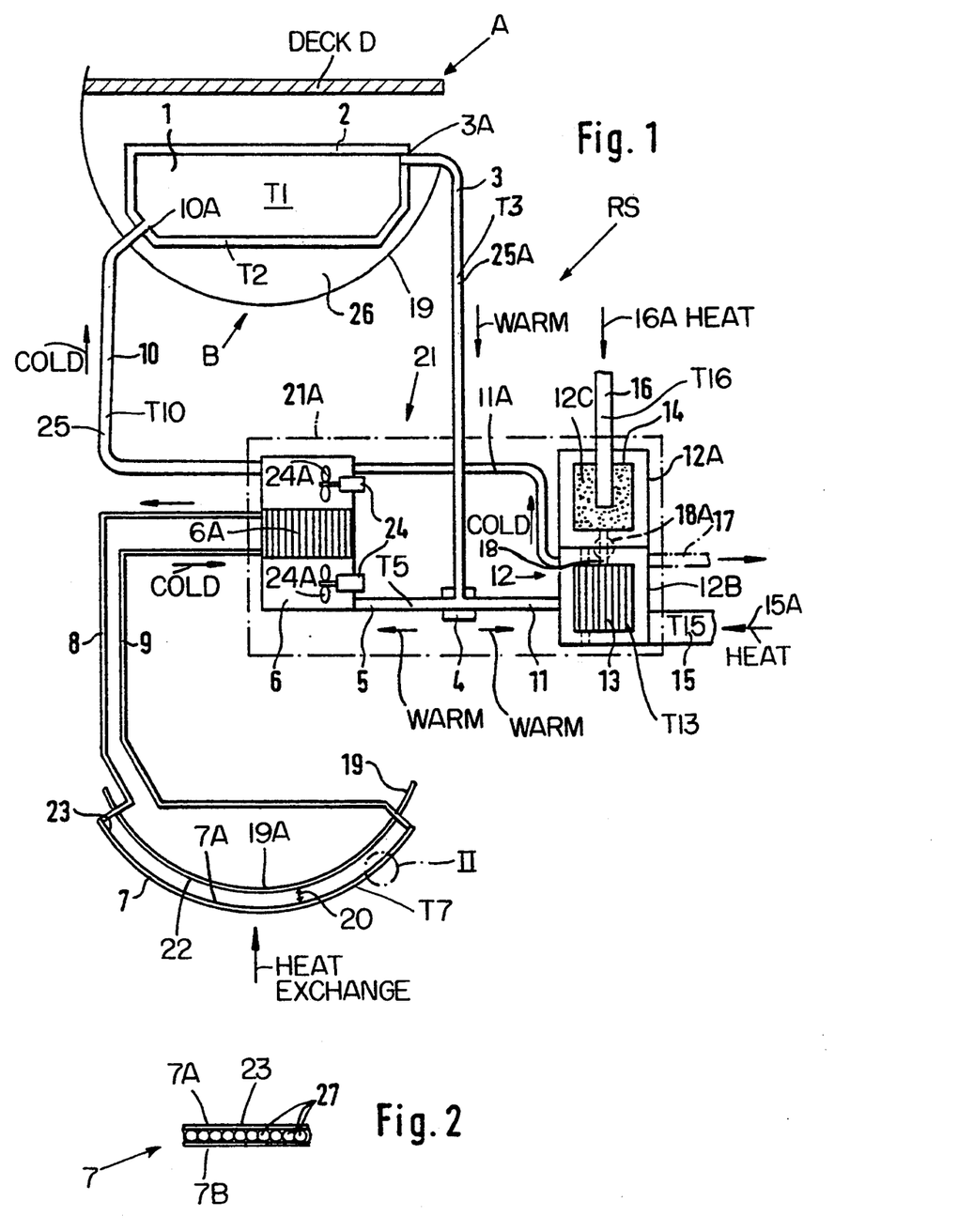
FIG. 1 lows a first embodiment of a refrigeration system according to the invention with a cooled catering container and a zeolite cooler as part of the refrigeration system.
FIG. 2 is a sectional view through a surface or flat heat exchanger that is used in the system of FIG. 1 at a spacing relative to the outer skin of the aircraft body.

FIGS. 1 and 2 illustrate a first embodiment of a refrigeration system RS according to the invention installed in an aircraft A having a body B with a wall 19 and a deck D leaving a loading space 26 below deck. A catering container 1 is installed in the loading space 26. The catering container 1 can be moved into and out of the loading space 26 as is conventional. The catering container may hold serving carts, trolleys, or boxes or the like which contain the foodstuff for the passengers and crew aboard the aircraft. According to the invention the catering container 1 is constructed with a double wall that may serve several purposes. The double wall forms a good heat insulator. Further, the space between the two walls forming the double wall may be used as a fresh water tank. Quick couplers 3A, 10A connect the container 1 to the refrigeration system RS.

According to the invention a refrigeration device 21 is installed in the loading space 26. The refrigeration device 21 comprises at least one, preferably several refrigeration units 6, 12A, 12B as will be described in more detail below. The refrigeration units are of a modular construction so that one unit can be easily exchanged against another unit, for example, for facilitating maintenance work.

Figure 3:
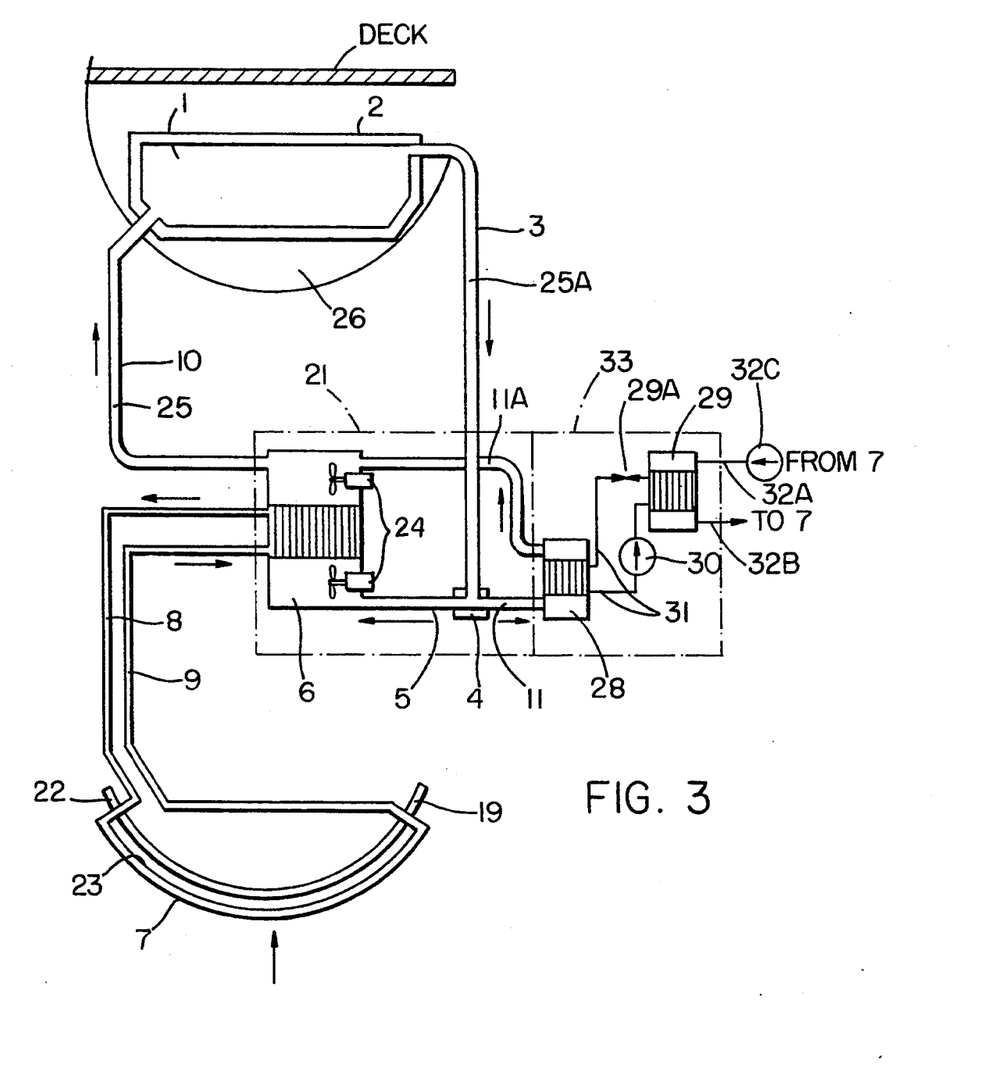
FIG. 3 is a system view similar to that of FIG. 1, however illustrating a compressor and condenser cooling device as part of the refrigeration system.

The present system further comprises a surface type heat exchanger 7 mounted at a certain spacing 20 from and outside of the wall 19 of the aircraft body B as shown in FIGS. 2 and 3. Thus, the surface type heat exchanger 7 is mounted outside the aircraft and its configuration will take into account aerodynamic flow requirements. However, the surface type heat exchanger 7 could also be integrated into a surface area 19A of the aircraft body 19. In both instances the arrangement is such that the surface type heat exchanger can be quickly checked or tested and if necessary exchanged without any problems. The term "surface type heat exchanger" as used herein refers to a heat exchanger in which the heat exchange takes place by a flow of the cooling medium along the outer uninterrupted exposed surface of the heat exchanger 7.

Where the surface type heat exchanger 7 is mounted with a spacing 20 outside the outer surface of the body wall 19 as shown in FIG. 1, it is preferred to provide a surface area 19A facing outwardly of the wall 19 with a mirror layer or film 22 that is corrosion protected. Similarly, the inwardly facing surface area 7A of the exchanger 7 is provided with a mirror coating 23 facing inwardly. The mirror coating 23 is also corrosion protected. These mirror surfaces facing each other make sure that a heat exchange between the aircraft body surface and the exchanger 7 is minimized so that a liquid cooling medium, for example methanol, can be cooled with an optimal efficiency. For this purpose, the heat exchanger 7 as shown in FIG. 2 comprises a plurality of capillary ducts 27 between the outer heat exchange surface 7B and the inner surface 7A that is provided with the mirror coating 23.

Referring further to FIG. 1, the refrigeration device 21 comprises a heat exchanger 6 and a zeolite cooler 12 having an upper housing section 12A and lower housing section 12B. The upper section 12A holds a container 12C provided with a zeolite mineral 14 exposable to heat through a heat duct 16 in which heat 16A is supplied to evaporate water held in the zeolite mineral 14. The lower housing section 12B of the zeolite cooler 12 contains an evaporator 13 connected to the zeolite container 12C through a pipe or duct 18 with a valve 18A. The container 12C and the evaporator 13 are spaced from the inner wall of the respective housing section 12A, 12B. The heat exchanger 6 in the refrigeration device 21 has, for example, two fan motors 24 driving circulation propellers 24A. The heat exchanger 6 is connected through a pipe or conduit 8 with the capillary ducts 27 in the heat exchanger 7. Heat carrying coolant passes thus from the heat exchanger 6 through the duct or pipe 8 into the heat exchanger 7. Cool coolant returns from the heat exchanger 7 through a pipe or duct 9 to the heat exchanger 6, which is connected through a conduit 10 carrying cool coolant, such as cold air 25 into the cooler box 1. The pipe or conduit 10 is connected to the box 1 with a quick coupling device 10A. A return conduit 3 for warm air 25A connected with a quick coupling device 3A to the box 1 closes the return flow circuit through a valve 4 and a pipe or conduit 5 connecting the valve 4 to he heat exchanger 6. The valve 4 is further connected through a pipe or conduit 11 to the housing section 12B of the zeolite cooler 12, which has an inlet 15 connected to a warm air supply 15A. A remainder heat discharge 17 leads out of the refrigeration device 21. A pipe or conduit 11A interconnects the heat exchanger 6 with the housing section 12B to supply additional coolant into the heat exchanger 6. The coolant such as methanol from the heat exchanger 7 passes through the pipe or duct 9 into the heat exchanger 6 where it takes up heat from the air 25A that is being transported by the blowers 24. The capillary ducts 27 in the heat exchanger 7 and the pipes or ducts 8 and 9, as well as the heat exchanger 6 form a closed coolant circulating circuit in which the coolant cools the air flowing through the spaces between cooling surfaces 6A in the heat exchanger 6. A continuous coolant circulation is established between the two heat exchangers 6 and 7 by the capillary action of the capillary ducts 27. However, instead of the flow by capillary action, a gravitational flow or a pump driven flow of the coolant may be maintained.

According to one embodiment, the refrigeration device 21 is equipped with the above described zeolite cooler 12 for maintaining the temperature difference between the below deck loading space 26 and the interior of the cooler box 1, even if the aircraft should be at low altitudes where the temperature difference required for the proper operation of the heat exchanger 7 is no longer available. The zeolite cooler 12 starts operating when the temperature at the heat exchanger 7 outside the aircraft body does not provide the above mentioned temperature difference anymore at low altitudes. For this purpose, the valve 4 is temperature responsive and switches the circulating circuit for the cooling air so that now the ducts 11 and 11A are connected into the circuit, whereby the hot air 25A passes into the housing 12B to be cooled by the evaporator 13. The cooled air then passes through the duct 11A and the upper portion of the Pleat exchanger 6 into the pipe or duct 10 and back into the cooling box 1. Thus, the zeolite cooler 12 takes over the further cooling without any additional auxiliary equipment that was necessary heretofore. The zeolite cooler 12 operates by evaporating water in the evaporator 13. The resulting water vapor passes into the container 12C through the pipe 18 with the valve 18A open. The evaporation heat cools the water until at an adjustable point of time the zeolite filling 14 in the container 12C requires a heat input to remove water or water vapor from the zeolite mineral 14 so that thereafter a new cycle may be started. The additional heat 16A is supplied through the duct 16. The heat coming through the duct 16 may, for example, be taken off as a tap flow from an aircraft engine or a heating cartridge may be provided for this purpose. The container of the evaporator 13 and the container holding the zeolite 14 are evacuated containers that are separable by the valve 18A. When this valve 18A is opened a new cycle begins.

The zeolite cooler 12 is also equipped with an initial heat supply inlet port 15 provided with a valve not shown and with a remainder heat discharge port 17 also provided with a valve not shown. Thus, warm air may be supplied for an initial start up. For this purpose the valves in the ports 15 and 17 are connected to the control circuit of the refrigeration system RS. Thus, the zeolite cooler can, for example, be tested without hot air coming through the ducts 3 and 11.

All structural components and modular units of the cooling or refrigeration device 21 are mounted in a con, non housing 21A which is lockable into a mounted position in the loading space 26 by conventional rapid locking devices such as freight locking devices used for the catering containers 1. The interior of the aircraft body 19 is equipped with such freight locking devices for this purpose. Thus, the entire housing 21A is easily accessible, for example, for maintenance purposes and may be equally easily exchanged since the housing 21A can now be handled just as a catering container. The cooling device 21 is equipped with suitable thermo element sensors controlling electrical circuits, which in turn control the heat supply and the refrigeration power. Cool air flowing through the duct 11A and the duct 10 passes directly from the zeolite cooler 12 into the cooling box 1 for holding the foodstuffs in the container 1 at the desired temperature even if the aircraft is on the ground or at low altitudes.

The foodstuffs contained in the cooling box 1 may even be precooled before they are stored in the container 1.

The above mentioned double wall construction of the container 1 to form a fresh water tank 2 is such that the container 1 itself functions as a water cooler for the fresh water in the tank 2 which thus utilizes any remainder heat still sufficient for cooling the fresh water.

The closed coolant circulating circuit including the heat exchanger 6, the external heat exchanger 7, and the two ducts 8 and 9 may be equipped with a pump for circulating the coolant, such as methanol, whereby the pump may provide exclusively the circulating force for moving the coolant or the pump action may be provided in addition to the capillary action of the capillary ducts 27 in the heat exchanger 7.

Referring further to FIG. 1, the following temperature schedule indicates the various temperatures in the system during a working cycle, whereby the letter T with the respective index refers to the temperature in the corresponding component.

TABLE A

| | | |
|---|---|---|
| T1 | Temperature of the cooler box 1 | = +8° C. |
| T2 | Temperature in the fresh water tank 2 | = +10° C. |
| T3 | Temperature in the warm air duct 3 | = +15° C. |
| T5 | Temperature in the warm air duct 5 | = +14° C. |
| T7 | Temperature in the surface heat exchanger 7 | = +8.5° C. to −56° C. |
| T10 | Temperature in the cool air duct 10 | = 0° C. |
| T13 | Temperature in the evaporator 13 | = +4° C. to 0° C. |
| T15 | Temperature in the inlet port 15 | = +20° C. to +80° C. |
| T16 | Temperature in the heat supply duct 16 | = +300° C. |

Referring to FIG. 3, the components which are the same as in FIG. 1 will not be described again. The modified embodiment of FIG. 3 comprises instead of the zeolite cooler 12, a compressor refrigeration system 33 referred to as compressor unit 33. The compressor unit 33 performs the same function as the zeolite cooler 12 to maintain the required temperature difference between the space 26 and the interior of the cooler box 1 when the efficiency of the surface heat exchanger 7 becomes inadequate, for example when the aircraft is descending to lower altitudes. Again, the temperature responsive valve 4 switches from the operation with the heat exchanger 7 to the operation with the compressor unit 33 which also comprises an evaporator 28, a compressor proper 30, and a condenser 29 interconnected through pipes or ducts 31 to form a closed circuit in which there is an expansion valve 29A. The coolant in the circulating circuit 31 provides cooling energy to the evaporator 28 which supplies the required cool air 25 through the ducts 11A and 10 into the cooler box 1 as described above. The coolant in the circuit 31 is compressed in the compressor 30 and passed into the condenser 29 which removes heat from the coolant by a heat exchange, whereby the coolant may be liquid or gaseous. The cooled coolant is supplied through the circuit 31 back to the evaporator 28. The condenser 29 has an inlet port 32A and an outlet port 32B with a pump 32C in the circulating circuit. Cooling energy is supplied through the circuit connected to the inlets and outlets 32A, 32B. The inlet and outlet are connected to a cooling liquid container, preferably the surface type heat exchanger 7. Proper valves are provided in the connecting ducts from the inlet and outlet 32A, 32B to the heat exchanger 7 so that when the valve 4 is switched to supply warm air to the evaporator 28, the coolant from the heat exchanger 7 flows to the condenser 29 and not to the heat exchanger 6. This arrangement has the advantage that the coolant from the heat exchanger 7 still provides some cooling for the compressor unit 33 even though the temperature difference between the inside and outside of the aircraft is at that moment not quite sufficient for cooling, by itself, the cooler box 1.

In a modified embodiment the inlet port 32A and outlet port 32B may be connected to a space inside the aircraft body B, preferably the space 26 which is not heated. However, other spaces within the aircraft body may be suitable. An airstream, especially an airstream from the space 26 and/or an airstream from outside the aircraft flows through the inlet 32A, through the condenser 29, and out again through the outlet 32B. Thus, a cooling can be achieved in the condenser 29 with simple means which are inexpensive. The cooled air 25 in the duct 10 from the refrigeration device 21 coming from the evaporator 28 of the compressor unit 33 through the duct 11A flows through the further duct 10 to the cooler box 1 to maintain the temperature that is necessary to keep the precooled foodstuffs in the box 1 fresh.

Figure 4:
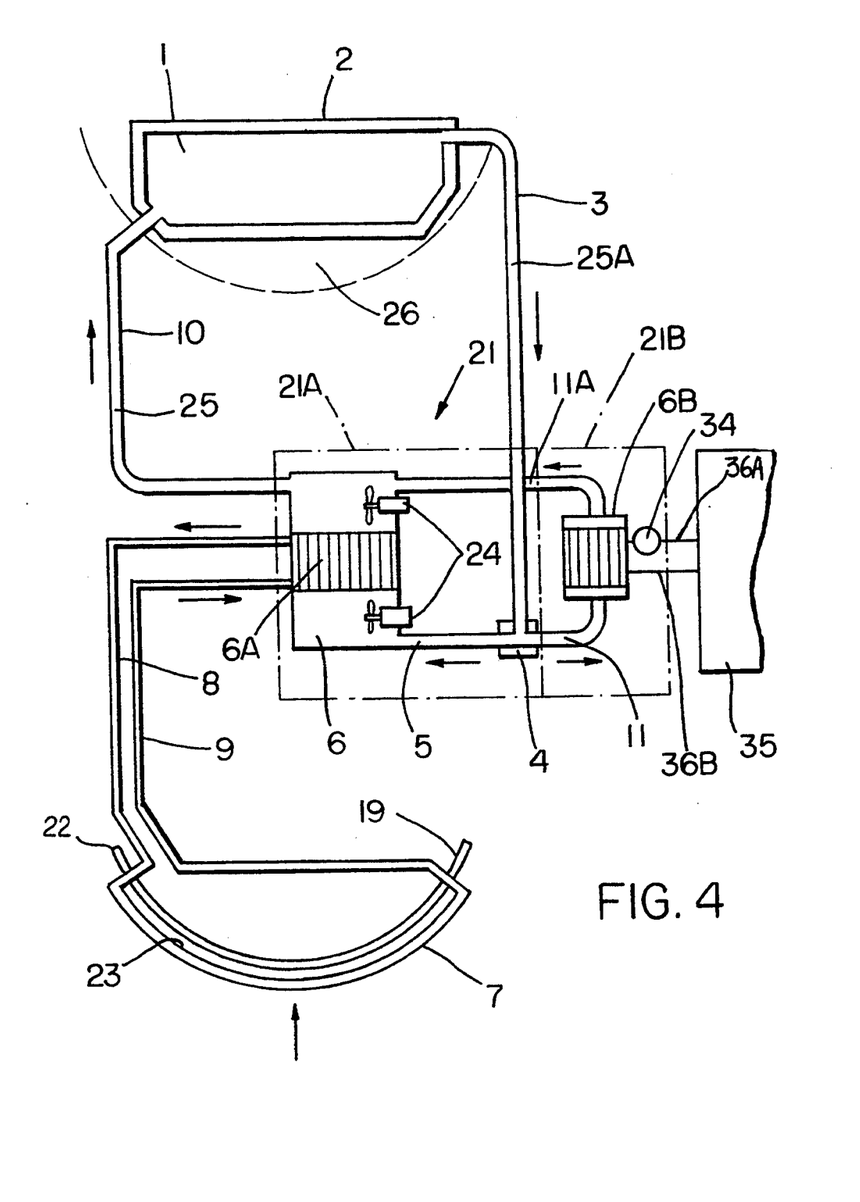
FIG. 4 illustrates schematically a system similar to that of FIG. 1, however aided by an air conditioning system normally present in the aircraft.

FIG. 4 shows a further modification in which the refrigeration device 21 comprises a second modular heat exchanger 6B. A coolant circulating circuit 36A, 36B including a pump 34 connects the second heat exchanger 6B to an air conditioning system 35 conventionally provided in a passenger aircraft. The function is again similar to that described above. When the temperature to which the external heat exchanger 7 is exposed, becomes too high for an efficient cooling of the cooler box 1, the valve 4 switches over to now operate the system through the second heat exchanger 6B. The pump 34 supplies the coolant from a heat sink of the air conditioning system 35. The air from the cooler box 1 is supplied to the second heat exchanger 6B for a heat exchange with the cooling medium from the air conditioning system 35. The cooled air 25 is then flowing through the duct 11A, the first heat exchanger 6, the duct 10, and into the cooler box 1. The warm air 25A returns through the pipe or duct 3, the valve 4, and the pipe or duct 11 to the second heat exchanger 6B.

Figure 5:
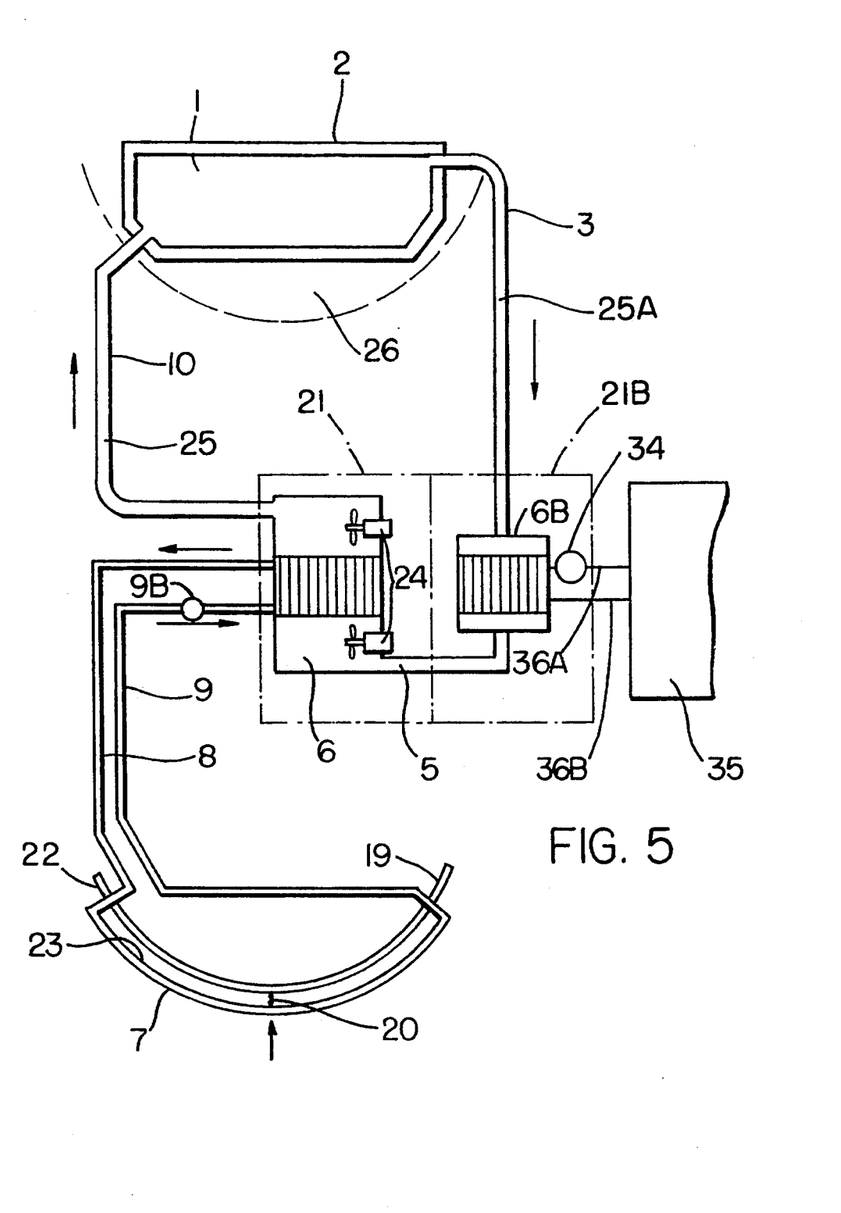
FIG. 5 illustrates a modification of the system of FIG. 4.

FIG. 5 shows a modification similar to that of FIG. 4 with two heat exchangers 6 and 6B. However, the embodiment of FIG. 5 is simpler in that the second heat exchanger 6 which cooperates with the air conditioning system 35 is directly connected to the duct 3 and through the further duct 5 to the first heat exchanger 6. The pump 34 in the duct 36A, 36B connecting the second heat exchanger 6B to the air conditioning system 35 may be switched on and off in response to a temperature sensor not shown so that upon reaching an altitude where the heat exchanger 7 becomes inefficient, the second heat exchanger 6B can be switched on in the system. The pump 9b in the duct 9 may be switched to the opposite state of pump 34 to stop heat exchange through heat exchangers 6 and 7 when pump 34 is active. In fact, the system of FIG. 5 may operate both heat exchangers 6 and 6B simultaneously if desired. The simpler construction of FIG. 5 has the advantage that it is more lightweight and its simplicity results in a highly reliable operation.

Figure 6:
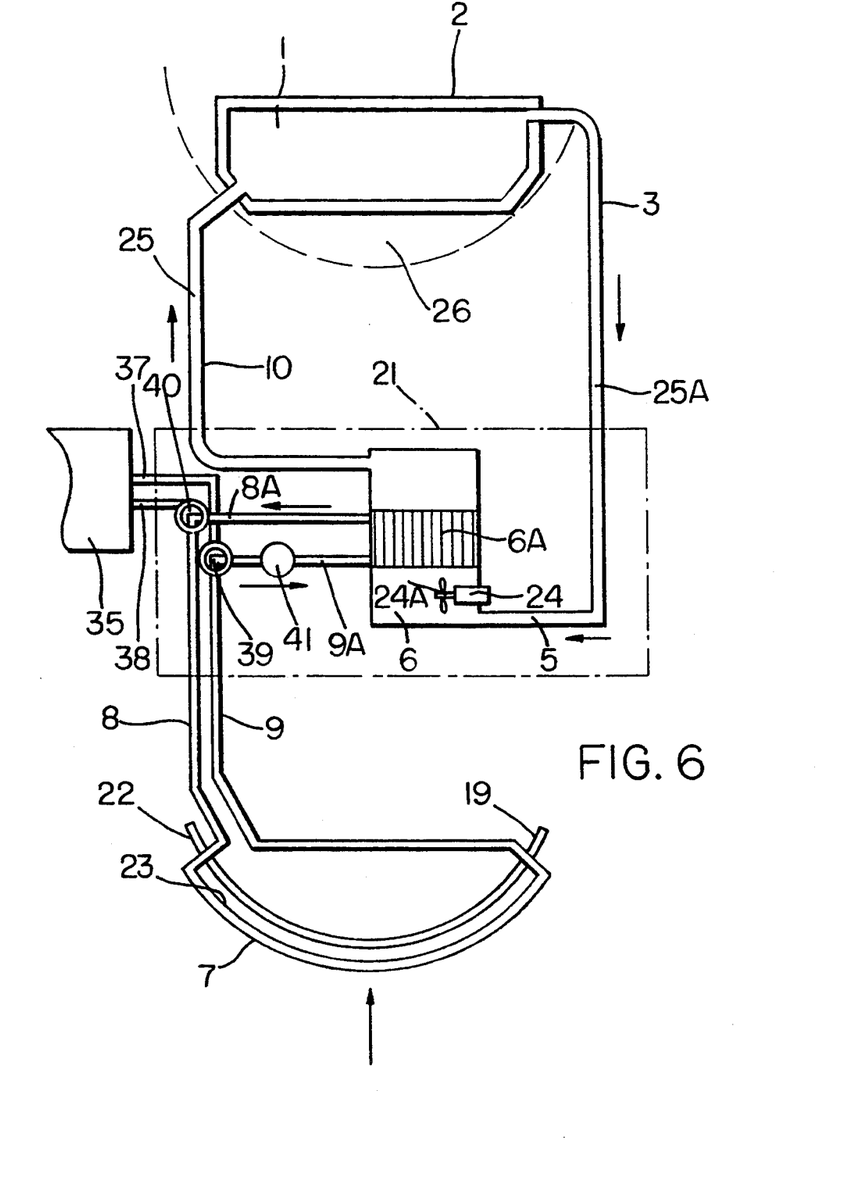
FIG. 6 shows a further modification of a refrigeration system cooperating with an air conditioning system in the aircraft.

FIG. 6 shows a further embodiment in which the refrigeration device 21 comprises but one heat exchanger 6 that is connected in two closed circuit coolant circulating circuits. The first circuit includes the ducts 8 and 9 as well as 8A and 9A connecting the heat exchanger 6 to the external heat exchanger 7 through switching valves 39 and 40. Preferably, a pump 41 is provided in the circulating circuit. A further closed circuit is established with the air conditioning system 35 through pipes or ducts 37 and 38 connected to the switching valves 39 and 40 respectively. Depending on the position of the valves 39 and 40, the heat exchanger 6 cooperates either with the heat exchanger 7 or with the air conditioner system 35 through the coolant conduits 37, 38. The valves 39 and 40 are preferably also temperature controlled valves which perform the switch-over when the temperature difference to which the external heat exchanger 7 is exposed becomes too low for an efficient operation. Once the switch-over has been completed, the ducts or pipes 37, 38 connect the heat exchanger 6 through the valves 39 and 40 and the ducts 8A and 9A to a heat sink in the air conditioning system 35. Thus, air coming from the cooling box 1 through the duct 3 is cooled in both instances in the spaces 6A of the heat exchanger 6 driven by the propeller 24A of the fan 24. The air circulating circuit is the same in both instances since the air to be cooled flows always through the heat exchanger 6 where heat is removed from the cooling air. By utilizing the air conditioning system 35 that is provided in passenger aircraft anyway, an efficient cooling of the foodstuffs for the passenger service has been achieved in a cost effective manner.

Although the invention has been described with reference to specific example embodiments, it will be appreciated that it is intended to cover all modifications and equivalents within the scope of the appended claims.

What we claim is:

1. A refrigeration system for cooling foodstuff inside an aircraft body having a deck and a loading space (26) below said deck, comprising a surface type heat exchanger (7) positioned for a heat exchange with the external environment of the aircraft, a catering container (1) constructed as a cooler box (2) for said foodstuff, and at least one refrigeration device (21) exchangeably mounted in said loading space below said deck and connected to said catering container for cooling the content of said catering container, said refrigeration device (21) comprising at least one modular refrigeration unit (6), first conduit means (8, 9) for connecting said surface type heat exchanger (7) to said refrigeration device (21) and second conduit means (3, 10) for connecting said cooler box (1) to said refrigeration device (21), whereby a temperature difference between inside and outside of said aircraft is efficiently used by said refrigeration system, and wherein said at least one refrigeration device (21) comprises a housing formed as a container (21A) comprising rapid connector means for exchangeably securing said container housing (21A) in said loading space (26), whereby said container housing (21A) containing said refrigeration device (21) can be handled like said catering container (1) containing said foodstuff.

2. The refrigeration system of claim 1, wherein said cooler box catering container comprises a double wall forming a fresh water tank (2).

3. The refrigeration system of claim 1, wherein said surface type heat exchanger (7) is arranged outside said aircraft body with a spacing (20) between said heat exchanger and said aircraft body.

4. The refrigeration system of claim 1, wherein said surface type heat exchanger (7) is integrated into an outer wall of said aircraft body with an outer wall of said heat exchanger (7) in heat exchange contact with the environment.

5. The refrigeration system of claim 1, wherein said refrigeration device (21) comprises a plurality of modular refrigeration units including a heat exchanger (6), a zeolite cooler (12), and an evaporator (13), all said refrigeration units being mounted in said container housing (21A).

6. The refrigeration system of claim 3, wherein said surface type heat exchanger (7) has a first surface area (7A) facing said aircraft body, and wherein said aircraft body has a second surface area facing said first surface area of said surface type heat exchanger, each of said first and second surface areas having a corrosion protected mirror coating, said mirror coatings facing each other across said spacings.

7. The refrigeration system of claim 1, wherein said refrigeration device (21) comprises a modular heat exchanger unit (6) and a modular refrigeration compressor unit (33) both units being mounted in said container housing (21A).

8. The refrigeration system of claim 1, wherein said refrigeration device (21) comprises two modular heat exchangers.

9. The refrigeration system of claim 1, wherein said refrigeration device comprises a heat exchanger (6), coolant ducts (37, 38) connected to a heat sink of an air conditioning system of said aircraft, and valve means for switching said heat exchanger (6) for connection to said coolant ducts (37, 38) connecting said heat exchanger (6) to said heat sink of said air conditioning system.

10. The refrigeration system of claim 5, further comprising pipes or ducts interconnecting said cooler box (2), said heat exchanger (6) and said zeolite cooler (12), a valve (4) in said pipes or ducts for switching said zeolite cooler (12) into the system when the cooling power of said surface type heat exchanger (7) fails to maintain the desired temperature difference between said space (26) below deck and said cooler box (1), a heat supply (16) connected to said zeolite cooler (12) for exposing a zeolite mineral to heat readily available in said aircraft, a heating device for expelling water or water vapor from said zeolite mineral, and duct means (18) for feeding said water or water vapor to an evaporator (13) where a cycle of evaporation and condensation is repeated to again charge said zeolite mineral for extracting heat from the water.

11. The refrigeration system of claim 7, further comprising duct and valve means for switching said modular refrigeration compressor unit (33) into said refrigeration system, wherein said duct and valve means (31, 29A) interconnect an evaporator (28), a condenser (29) and a compressor (30) of said modular refrigeration compressor unit in a coolant refrigeration circuit (31), and wherein said condenser (29) communicates with a cooling duct circuit (32A, 32B) including a supply pipe (32A) and a discharge pipe (32B) to form a coolant circulating circuit.

12. The refrigeration system of claim 11, wherein said cooling duct circuit (32A, 32B) is connected with a coolant container, preferably in the form of said surface type heat exchanger (7), whereby coolant in the surface type heat exchanger (7) is able to flow through said cooling duct circuit (32A, 32B) and through said condenser (29).

13. The cooling system of claim 11, wherein said cooling duct circuit (32A, 32B) is connected with said space below deck in said aircraft, which is preferably unheated, and/or with the outside of the aircraft, and a pump (32C) in one of said coolant ducts (32A, 32B) for circulating cold coolant, such as air, through said coolant duct circuit (32A, 32B).

14. The cooling system of claim 8, further comprising duct and valve means for switching said second heat exchanger (6A) into said refrigeration system, and wherein said second heat exchanger (6A) is connected with an air conditioning unit (35) through an inlet pipe (36A) and a discharge pipe (36B).

15. The refrigeration system of claim 1, wherein said surface type heat exchanger (7) is shaped to conform to the surface of the aircraft body (19) at the location where said surface type heat exchanger (7) is installed, and wherein said surface type heat exchanger (7) comprises capillary ducts (27) for a liquid coolant.

16. The cooling system of claim 1, wherein cooling medium that has been cooled in the surface type heat exchanger passes through a duct (9) into said at least one modular refrigeration unit including a heat exchanger (6) where said cooling medium takes up heat from air (25A) blown in by a blower (24) forming part of said heat exchanger (6), from catering container cooler box (1) thereby cooling said catering container cooler box, and wherein the cooling medium passes back to said surface type heat exchanger (7) through a duct (8).

17. The refrigeration system of claim 1, wherein said system further comprises sensors and electronic control circuits for controlling a heat supply and for controlling a cooling capacity.

18. The refrigeration system of claim 1, wherein said container cooler box (1) has double walls (2) forming a heat insulation.

* * * * *

UNITED STATES PATENT AND TRADEMARK OFFICE
CERTIFICATE OF CORRECTION

PATENT NO.  : 5,369,960
DATED       : December 6, 1994
INVENTOR(S) : Hans-Juergen Mueller, et al It is certified that error appears in the above-indentified patent and that said Letters Patent is hereby corrected as shown below:

```
Col. 2, line 15, replace "lows" by --shows--.
Col. 3, line 38, after "12B." make a paragraph spacing.
Col. 4, line 24, replace "Pleat" by --heat--;
        line 53, replace "con," by --common--;
        line 54, delete "non".
```

Signed and Sealed this

Thirty-first Day of January, 1995

Attest:

BRUCE LEHMAN

*Attesting Officer*   *Commissioner of Patents and Trademarks*